UNITED STATES PATENT OFFICE.

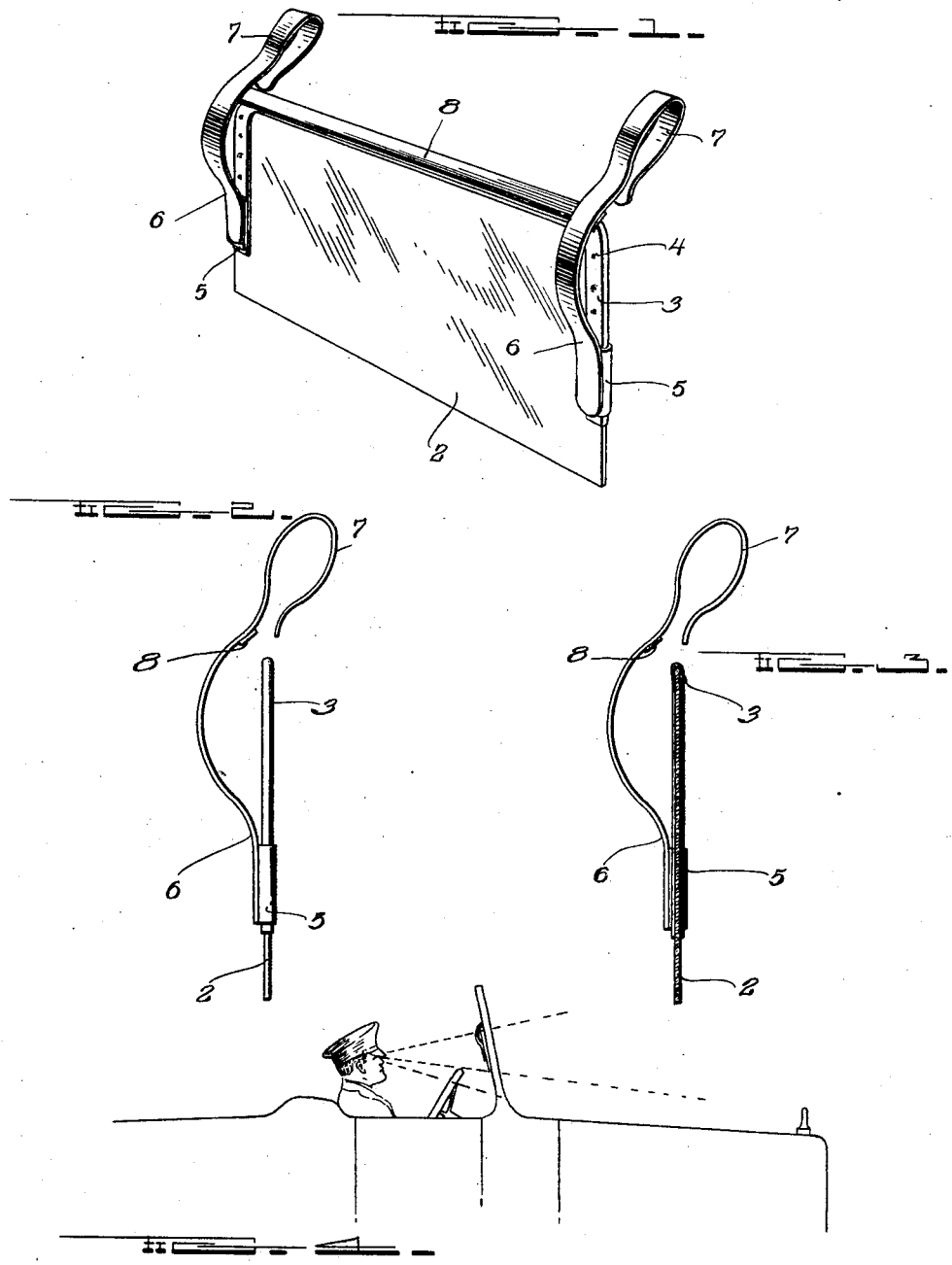

ROY H. WOODMANSEE, OF DENVER, COLORADO.

GLARE-SHIELD ATTACHMENT FOR AUTOMOBILE-WINDSHIELDS.

1,388,446.   Specification of Letters Patent.   Patented Aug. 23, 1921.

Application filed August 16, 1920. Serial No. 403,678.

*To all whom it may concern:*

Be it known that I, ROY H. WOODMANSEE, a citizen of the United States, residing at Denver, in the county of Denver and State of Colorado, have invented new and useful Improvements in Glare-Shield Attachments for Automobile-Windshields, of which the following is a specification.

My present invention has for its object the provision of a simple, inexpensive and easily applied article of manufacture adapted when correctly arranged with respect to the wind shield of an automobile to protect the eyes of the driver against the glare of approaching automobiles as well as against reflection of the sun on a roadway.

My said novel attachment is particularly characterized by the facility with which it may be placed and adjusted, and by its durable and non-rattling qualities.

To the attainment of the foregoing the invention consists in the improvement as hereinafter described and definitely claimed.

In the accompanying drawings, hereby made a part hereof:—

Figure 1 is a perspective of my novel glare shield *per se.*

Fig. 2 is an end elevation of the same.

Fig. 3 is a vertical transverse section of the shield.

Fig. 4 is a detail view illustrative of the manner in which the glare shield is positioned on an automobile wind shield.

Similar numerals of reference designate corresponding parts in all of the views of the drawings.

The automobile wind shield 1 may be and preferably is of the ordinary well known construction and need not therefore be further described.

My novel glare shield in the present and best embodiment of my invention of which I am cognizant includes a plate 2 of tinted glass, tinted celluloid or other translucent material, calculated to enable a driver to see under the same while effectively protecting the eyes of the driver from glare or from the reflection of strong light on a roadway.

One longitudinal edge and the end edges of the plate 2 are protected by a metallic binder 3, of channel form in cross section, which straddles the said edges of the plate and is preferably fixed thereto when the plate is of celluloid or the like by means of the indentures 4. In addition to the features mentioned the attachment includes resilient clips 5, designed to straddle and to securely clasp the side portions of the binder 3. To the said clips 5 are permanently secured the pendent bowed spring portions 6 of the hanger comprised in the attachment. The bowed spring portions 6 are merged at their upper ends into hooks 7 shaped to straddle the upper edge of the wind shield 1, and connected to and extending between the said spring portions 6 is a cross strip 8 which is also of thin and resilient sheet metal.

In the practical use of my novel attachment it will be readily understood that with the plate 2 arranged at one side of a wind shield, and the hooks 7 straddling the edge of the wind shield, and the bowed spring portions 6 disposed at the opposite sides of the wind shield to the plate 2, the plate 2 will be held under yielding pressure against the wind shield, but will be securely and safely held without liability of accidental displacement and without liability of rattling of the attachment attending the movement of the automobile and the vibrations incident thereto.

In addition to the facility with which it may be applied and removed and its capacity to avert rattling, my novel attachment is materially advantageous because of its cheapness and lightness, and the fact that it is calculated to enhance rather than detract from the finished appearance of an automobile wind shield.

Fig. 4 makes clear the fact that my improvement is virtually not a sight medium. On the other hand the improved device operates on the principle of light deflection in that the driver does not ordinarily look through the shield but under it. This, however does not interfere with the capacity of device to shield the eyes of the driver from glare.

Having described my invention, what I claim and desire to secure by Letters-Patent, is:—

As a new article of manufacture, a glare shield for use on the wind shield of an automobile, comprising a translucent plate, a metallic binder straddling and secured on one longitudinal edge and the upper portions of the end edges of the plate, resilient clips clasping the end portions of the binder and plate, spring portions bowed away from the binder and secured to and extending upwardly from said clips and merged at their upper ends into resilient hooks, and a strip extending between and connected to the upper portions of the said bowed spring portions.

In testimony whereof I affix my signature.

ROY H. WOODMANSEE.